United States Patent [19]
Rappleye et al.

[11] 3,861,633
[45] Jan. 21, 1975

[54] GROCERY CART HOOK

[76] Inventors: Ned E. Rappleye; June A. Rappleye, both of 4714 Richardson, Idaho 83705

[22] Filed: Sept. 12, 1973

[21] Appl. No.: 396,591

[52] U.S. Cl............................. 248/227, 280/DIG. 4
[51] Int. Cl............................................. F16b 45/02
[58] Field of Search..... 280/DIG. 4, 47.26, 33.99 A; 24/230.55 S; 248/211, 227, 306, 322, 304, 341

[56] References Cited
UNITED STATES PATENTS

| | | | |
|---|---|---|---|
| 2,443,236 | 6/1948 | Gallagher................ | 280/DIG. 4 UX |
| 2,583,513 | 1/1952 | Maslow................... | 280/DIG. 4 UX |
| 2,784,979 | 3/1957 | Chamberlin et al. ........ | 280/47.26 X |
| 3,313,507 | 4/1967 | Belli.............................. | 248/227 X |

FOREIGN PATENTS OR APPLICATIONS

| | | | |
|---|---|---|---|
| 471,831 | 2/1929 | Germany ........................... | 248/227 |

Primary Examiner—Donald A. Griffin
Attorney, Agent, or Firm—Howard I. Podell

[57] ABSTRACT

A hook fastened to a metal plate which is bolted to a side of a grocery cart for retention of a pocketbook of the user of the cart, while shopping. The hook is pivotably mounted so as to swivel in the horizontal plane, when mounted, and is fitted with a torsion spring to fix the hook in a latched position.

1 Claim, 4 Drawing Figures

PATENTED JAN 21 1975 3,861,633

GROCERY CART HOOK

SUMMARY OF THE INVENTION

My invention is a hook fastened to a metal plate which may be bolted onto a shopping cart for retention of a purse. The hook is mounted so as to be free to swivel to a latched or unlatched position and is fitted with a torsion spring which normally swivels the hook to the latched position. An advantage of my invention is that a purse hung on the hook is protected from theft. A further advantage of my invention is that the pocketbook or purse, so hung, does not interfere with the purchased items placed in the shopping cart.

BRIEF DESCRIPTION OF THE DRAWING

The objects and features of the invention may be understood with reference to the following detailed description of an illustrative embodiment of the invention, taken together with the accompanying drawing in which.

DESCRIPTION OF THE PREFERRED EMBODIMENT

Figure 1:
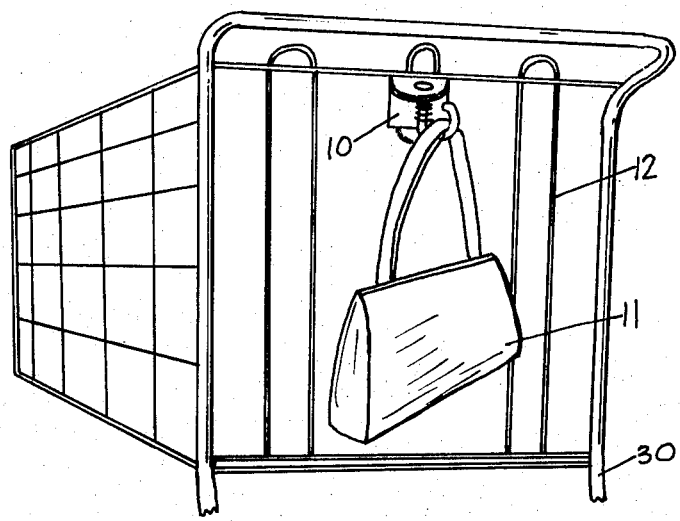
FIG. 1 illustrates a perspective view of the invention in use.

Turning now descriptively to the drawing, in which similar reference characters denote similar elements throughout the several views, FIG. 1 shows a purse 11 hooked onto the hook 10 which is bolted to the rear frame 12 of a grocery cart 30.

Figure 2:
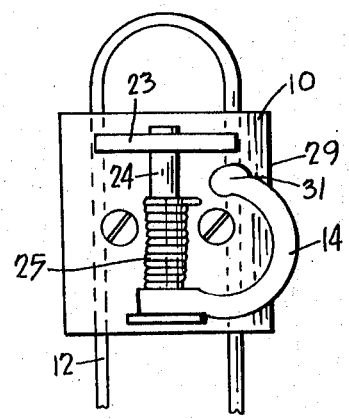
FIG. 2 illustrates a front view of the invention.
Figure 3:
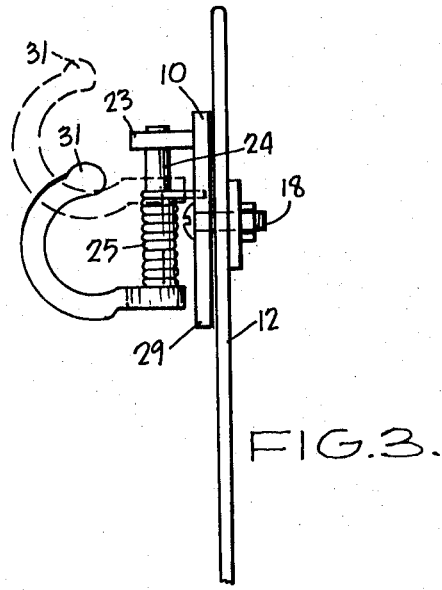
FIG. 3 illustrates a side view of the invention.
Figure 4:
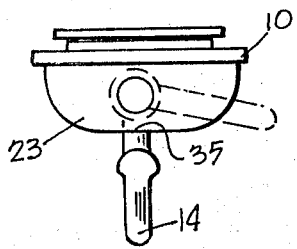
FIG. 4 illustrates a plan view of the invention.

FIGS. 2–4 show the construction of the hook assembly 10. Hook 14 is formed in a semi-circular shape of metal rod joined to a vertical axle bar 24 that is rotatably fastened to bracket plate 23.

Bracket plate 23 is fastened to base plate 29, which in turn may be bolted by screws 18 to the side members 12 of a shopping cart 30.

In the installed position, as shown in FIGS. 1–4, axle bar 24 is mounted in a vertical position, with hook 14 rotating in the horizontal plane about the axis of bar 24. Bracket plate 23 extends horizontally above the hook 14 when the hook 14 is rotated to either side, as shown in FIG. 2, preventing a latched object such as a purse 11 from being pulled off the open end 31 of hook 14. Torsion spring 25, about axle bar 24 rotates hook 14 normally to a side position.

When hook 14 is rotated manually to the central position, as shown in FIG. 4, a purse handle may be freely passed over open end 31 of the hook 14, since bracket plate 23, above hook 14 is relieved in the central location 35 of the base plate 23, permitting hook 14 to be slid vertically upwards with free end 31 of hook 14 rising above bracket plate 23, as shown in the dotted line view of FIG. 3.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A hook device adaptable for mounting to the exterior side of a shopping cart on which a hook member serves as a means of hanging the strap of an attached bag, in which the hook member is mounted to an axle rod, the axis of which is vertically oriented in the installed position to permit the hook member to rotate in the horizontal plane, together with a spring which is fastened on the axle rod so as to rotate the hook member to one side and under the side of an attached bracket plate, said bracket plate being shaped so as to permit the end of the hook member to rise above the bracket plate when the hook member is rotated manually so as to lie in a plane perpendicular to the side of the attached cart.

* * * * *